(12) United States Patent
Homec et al.

(10) Patent No.: US 11,932,335 B2
(45) Date of Patent: *Mar. 19, 2024

(54) ANGULAR RUB RAILS FOR TRAILERS (71) Applicant: HYUNDAI TRANSLEAD, San Diego, CA (US)

(72) Inventors: Laura Homec, San Diego, CA (US); Loc Quoc Bui, San Diego, CA (US); Weilun Chang, San Diego, CA (US)

(73) Assignee: HYUNDAI TRANSLEAD, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/140,989

(22) Filed: Apr. 28, 2023

(65) Prior Publication Data

US 2023/0264768 A1 Aug. 24, 2023

Related U.S. Application Data

(63) Continuation of application No. 17/368,649, filed on Jul. 6, 2021, now Pat. No. 11,702,164.

(51) Int. Cl.
*B62D 25/20* (2006.01)
*B62D 63/08* (2006.01)

(52) U.S. Cl.
CPC ......... *B62D 63/08* (2013.01); *B62D 25/2054* (2013.01)

(58) Field of Classification Search
CPC ........ B62D 21/20; B62D 33/02; B62D 33/04; B62D 33/044; B62D 25/2054; B62D 53/06; B62D 53/061; B62D 53/067; B62D 63/08; B60P 7/0807; B60P 7/0815

USPC ................................................ 296/184.1, 41

See application file for complete search history.

(56) References Cited

U.S. PATENT DOCUMENTS

| 4,083,592 | A | 4/1978 | Rubin et al. | |
|---|---|---|---|---|
| 6,733,219 | B1* | 5/2004 | Floe | B60D 1/065 |
| | | | | 296/57.1 |
| 7,568,754 | B2* | 8/2009 | Adams | B62D 25/2054 |
| | | | | 296/184.1 |
| 7,896,427 | B2* | 3/2011 | Adams | B62D 25/2054 |
| | | | | 296/184.1 |
| 8,439,427 | B2* | 5/2013 | Adams | B62D 25/2054 |
| | | | | 296/184.1 |
| 11,459,045 | B1* | 10/2022 | Hensiek | B62D 33/02 |
| 11,702,164 | B2* | 7/2023 | Homec | B62D 25/2054 |
| | | | | 296/41 |
| 2013/0036960 | A1 | 2/2013 | Berman et al. | |
| 2016/0207439 | A1* | 7/2016 | Hancock | B60P 7/0823 |
| 2017/0008581 | A1* | 1/2017 | Booher | B62D 21/20 |
| 2018/0272847 | A1* | 9/2018 | Beshiri | B62D 63/08 |
| 2019/0047637 | A1* | 2/2019 | DeMonte | B62D 27/065 |

(Continued)

*Primary Examiner* — Gregory A Blankenship
(74) *Attorney, Agent, or Firm* — Procopio, Cory, Hargreaves & Savitch LLP (57) ABSTRACT

A rub rail coupled to a side rail including a first top notch and a first bottom notch, the rub rail including: a top chamfer; a top horizontal face diagonally connected to the top chamfer; a second top notch extending out of the top horizontal face; a side vertical face diagonally connected to the top chamfer; a bottom chamfer; a bottom horizontal face diagonally connected to the bottom chamfer; a second bottom notch extending out of the bottom horizontal face; wherein the second top notch couples to the first top notch, and wherein the second bottom notch couples to the first bottom notch.

14 Claims, 9 Drawing Sheets

(56) References Cited

U.S. PATENT DOCUMENTS

| | | | |
|---|---|---|---|
| 2022/0144159 A1* | 5/2022 | Smith | B62D 25/2054 |
| 2022/0289306 A1* | 9/2022 | Thomas | B62D 25/2054 |
| 2023/0009915 A1* | 1/2023 | Homec | B62D 25/2054 |
| 2023/0264768 A1* | 8/2023 | Homec | B62D 25/2054 296/41 |
| 2023/0331324 A1* | 10/2023 | Homec | B62D 25/2054 |

* cited by examiner

ANGULAR RUB RAILS FOR TRAILERS

CROSS-REFERENCE TO RELATED APPLICATIONS

The present application is a continuation application of U.S. patent application Ser. No. 17/368,649 (filed Jul. 6, 2021; entitled "Angular Rub Rails for Trailers"). The disclosure of the above-referenced patent application is incorporated herein by reference.

BACKGROUND

Field of the Invention

The present disclosure relates generally to rub rails for trailers, and more specifically, to an angular rub rail and anchor points for the flatbed trailers.

Background

A flatbed trailer is designed to carry cargo tied down with various restraint devices including winches, ropes, straps, posts, chains, and other similar restraint devices. A strong support for connecting the restraint devices to the trailer is essential for safety of personnel and cargo. Commonly these devices are attached to the gaps between the side rail of a trailer and its rub rail. The side rail of a trailer is used to stabilize the floor assembly of a trailer, while the rub rail is designed to withstand side impacts from outside objects. Rub rail wear and tear is a common worry for cargo shippers. Denting and tearing of the rub rail are common sources of wear on flatbeds.

SUMMARY

The present disclosure describes an angular rub rail and anchor points for the flatbed trailers. In one implementation, the rub rail includes an angled corner extrusion cut with regular holes for the purpose of attaching restraint devices. Providing the cuts located within the area of the angled extrusion provides superior strength from side impacts, which often cause the significant damage to the rails of the trailer.

In one implementation, a rail assembly for a flatbed trailer is disclosed. The rail assembly includes: a side rail configured generally as C-shaped, the side rail including a first top horizontal face, a first side vertical face, and a first bottom horizontal face; and a rub rail coupled to the side rail, the rub rail configured generally as C-shaped, the rub rail including a second top horizontal face, a second side vertical face, and a second bottom horizontal face, wherein the second top horizontal face is coupled to the second side vertical face by a top chamfer, wherein the top chamfer is diagonally connected to the second top horizontal face and the second side vertical face, wherein the second bottom horizontal face is coupled to the second side vertical face by a bottom chamfer, wherein the bottom chamfer is diagonally connected to the second side vertical face and the second bottom horizontal face.

In another implementation, rail assembly for a flatbed trailer is disclosed. The rail assembly includes: a rub rail coupled to a side rail including a first top notch and a first bottom notch, the rub rail configured generally as C-shaped, the rub rail including a top horizontal face, a side vertical face, and a bottom horizontal face, wherein the top horizontal face is coupled to the side vertical face by a top chamfer, wherein the top chamfer is diagonally connected to the top horizontal face and the side vertical face, wherein the bottom horizontal face is coupled to the side vertical face by a bottom chamfer, wherein the bottom chamfer is diagonally connected to the side vertical face and the bottom horizontal face, the rub rail including a second top notch extending out of the top horizontal face, and a second bottom notch extending out of the bottom horizontal face, wherein the second top notch couples to the first top notch of the side rail, and the second bottom notch couples to the first bottom notch of the side rail.

In yet another implementation, a rub rail coupled to a side rail including a first top notch and a first bottom notch is disclosed. The rub rail includes: a top chamfer; a top horizontal face diagonally connected to the top chamfer; a second top notch extending out of the top horizontal face; a side vertical face diagonally connected to the top chamfer; a bottom chamfer; a bottom horizontal face diagonally connected to the bottom chamfer; a second bottom notch extending out of the bottom horizontal face; wherein the second top notch couples to the first top notch, and wherein the second bottom notch couples to the first bottom notch.

Other features and advantages of the present disclosure should be apparent from the present description which illustrates, by way of example, aspects of the present disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

A flatbed trailer includes two main beams which extend from the front to the rear of the trailer body. Also, cross members are attached transverse to the two main beams at a spacing of 12" to 16" across the entirety of the trailer.

Subsequently, the floor is laid on top of the cross members. The floor is often exposed to great forces of wear and tear during transport of cargo. To mitigate the stresses on the floor, side rails are attached to the outside edges of the cross members to provide stability to the cross members. The side rail is then protected with a railing called the "rub rail", which provides a cushion against side impacts on the trailer. Further, gaps between the side rail and the rub rail are used as space for cargo attachment devices.

As described above, wear and tear of the rub rail is a common problem for cargo shippers. The denting and tearing of the rub rail are common sources of wear on the flatbed trailers. Therefore, to address the issues involved with denting and tearing of the rub rail, certain implementations of the present disclosure provide for an angular rub rail and anchor points for the flatbed trailers. Accordingly, after reading this description it will become apparent how to implement the present disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

In one implementation, the rub rail of a side rail assembly of the flatbed trailer includes an angled corner extrusion cut with regular holes for the purpose of attaching restraint devices. Providing the cuts located within the area of the angled extrusion provides superior strength from side impacts, which often causes the significant damage to the rails of the trailer.

The present disclosure describes the improved strength design of the rub rail using angular corners. This improved strength design provides higher area moment of inertia than commonly found in the industry. The improved strength design also increases the strength of the rub rail from impacts in multiple different directions. The present disclosure also describes several different ways of attaching the improved rub rail design to the side rail.

Figure 1:
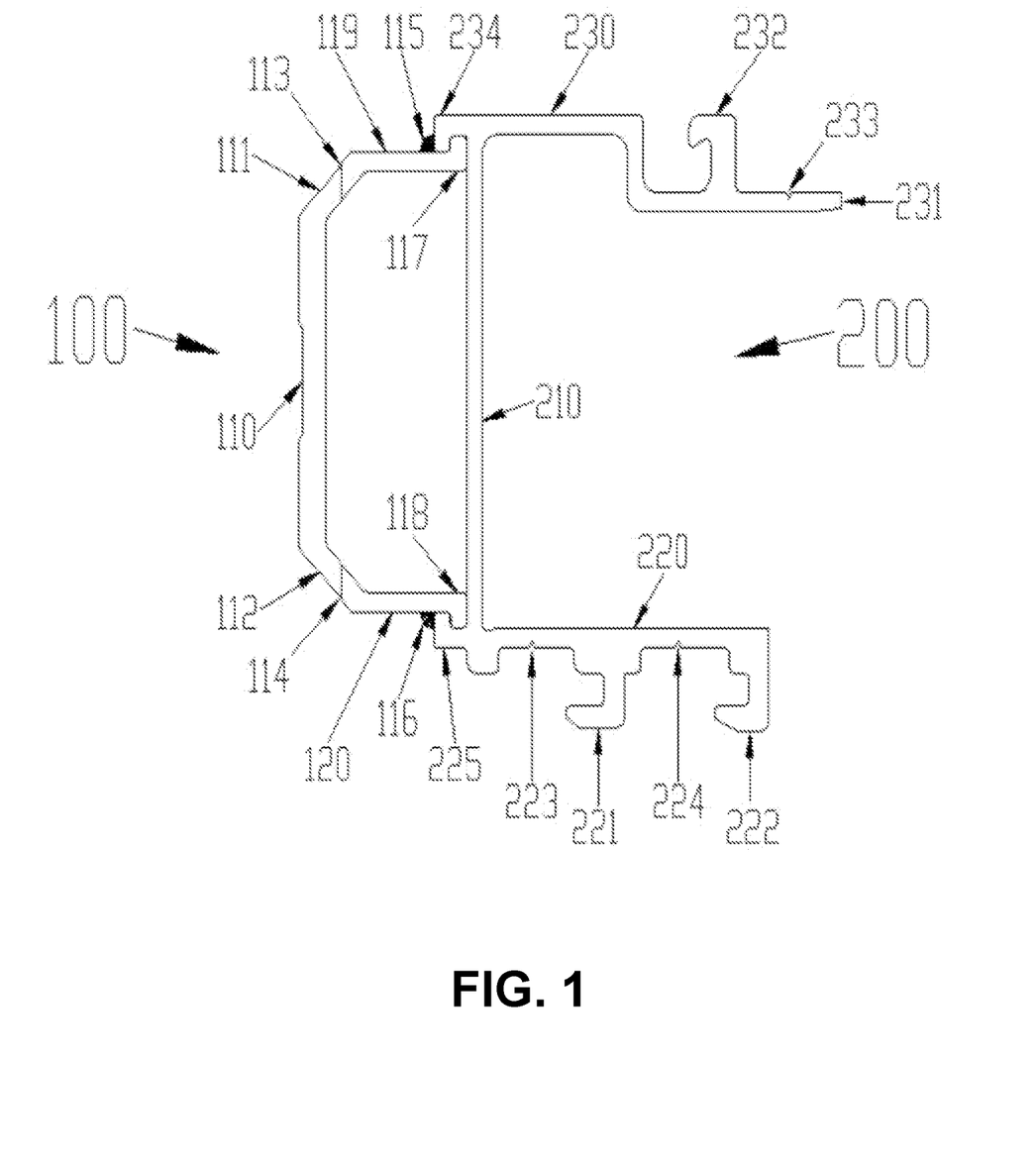
FIG. 1 is a side view of a rub rail coupled to a side rail in accordance with one implementation of the present disclosure.

FIG. 1 is a side view of a rub rail 100 coupled to a side rail 200 in accordance with one implementation of the present disclosure. The rub rail 100 and the side rail 200 runs the entire side of the trailer from front to rear. In one implementation, the rub rail 100 and the side rail 200 are formed with extruded aluminum.

In the illustrated implementation of FIG. 1, the side rail 200 is generally C-shaped and includes a top horizontal face 230, a side vertical face 210, and a bottom horizontal face 220. The top horizontal face 230 includes a hook 232 for attaching cargo securement devices and a downward step 231 for providing a surface to attach floor boards to the side rail 200. A notch 233 in the downward step 231 provides a mark for the location of the fasteners used to attach the floor boards to the side rail 200. The bottom horizontal face 220 includes double hooks 221, 222 for use by sliding winches and notches 223, 224 to mark the location of fasteners joining the cross members to the side rail.

In the illustrated implementation of FIG. 1, the rub rail 100 is generally C-shaped and includes a top horizontal face 119, a side vertical face 110, and a bottom horizontal face 120. The top horizontal face 119 is coupled to the side vertical face 110 by a top chamfer 111. The bottom horizontal face 120 is coupled to the side vertical face 110 by a bottom chamfer 112. Accordingly, in the illustrated implementation of FIG. 1, the rub rail includes five sides, which provide physical strength and damage-resistant characteristic.

In the illustrated implementation of FIG. 1, holes 113, 114 are cut in the top and bottom chamfers 111, 112, along the length of the rub rail 100. The holes 113, 114 provide locations to attach cargo restraint devices such as hooks, chains, straps, and posts. The top holes 113 are substantially aligned with the bottom holes 114. In one implementation, the top holes 113 start at the approximate center of the surface of the top chamfer 111 and run through the edge of the top horizontal face 119 of the rub rail 100. In one implementation, the bottom holes 114 start at the approximate center of the surface of the bottom chamfer 112 and run through the edge of the bottom horizontal face 120 of the rub rail 100. Starting the cut of the holes 113, 114 approximately half way through the top and bottom chamfers 111, 112 is important for maintaining the strength of the rub rail 100 by increasing the area moment of inertia of the vertical 110, top 119, and bottom 120 faces of the rub rail 100 in more directions. This increases the stiffness and strength of the design from impacts from the side, as well as from above and below.

Figure 2:
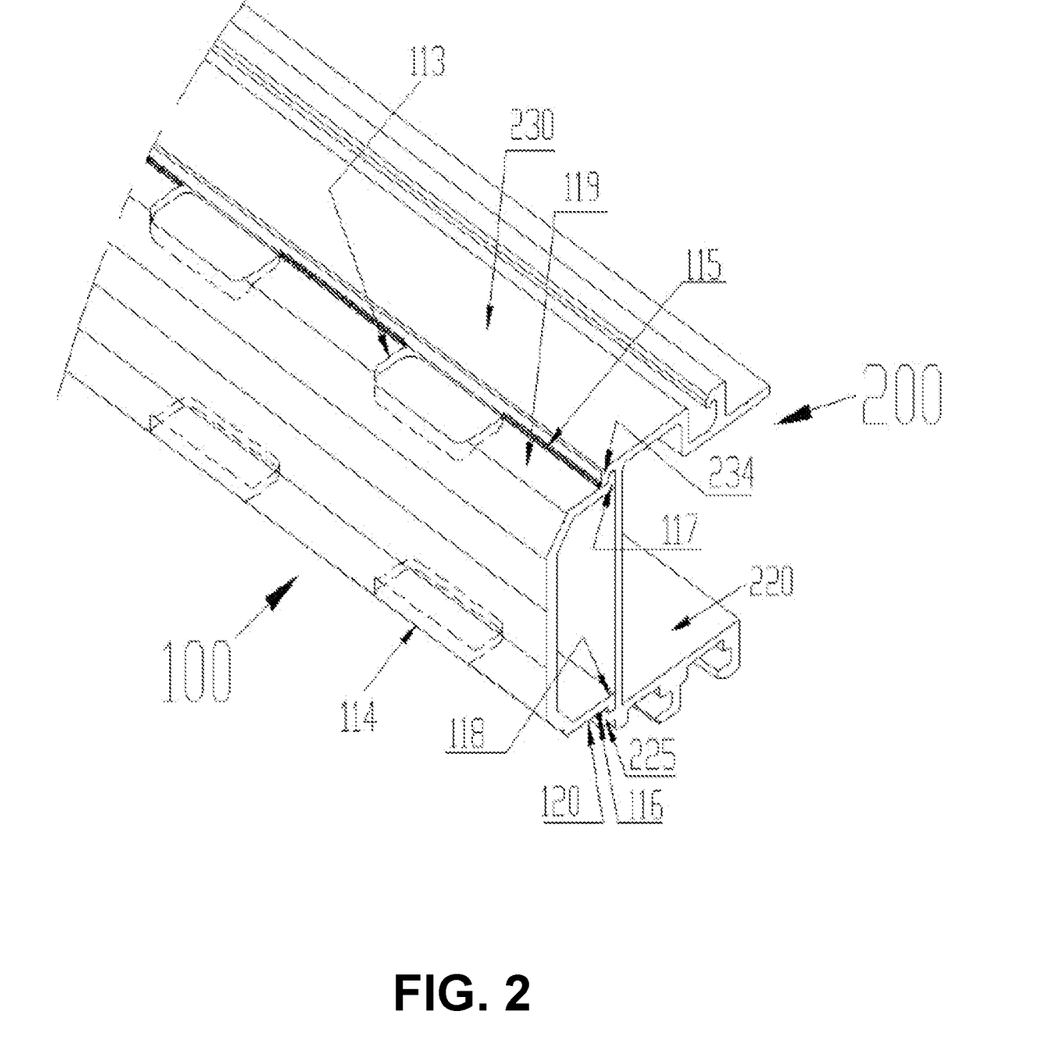
FIG. 2 is a top perspective view of the rub rail coupled to the side rail in accordance with one implementation of the present disclosure.

FIG. 2 is a top perspective view of the rub rail 100 coupled to the side rail 200 in accordance with one implementation of the present disclosure. In the illustrated implementation of FIG. 2, the side rail 200 includes a top notch 234 extruded as part of the top horizontal face 230 and a bottom notch 225 extruded as part of the bottom horizontal face 220. Further, the rub rail 100 includes a top notch 117 extending out of the top horizontal face 119 and a bottom notch 118 extending out of the bottom horizontal face 120. In the illustrated implementation of FIG. 2, the top notch 117 of the rub rail 100 is configured to slide under the top notch 234 of the side rail 200. The bottom notch 118 of the rub rail 100 is configured to slide on top of the bottom notch 225 of the side rail 200. Once the rub rail 100 and the side rail 200 are coupled together by sliding the notches 117, 118 of the rub rail 100 into the notches 234, 225 of the side rail 200, the rails 100, 200 can be joined together at joints 115, 116 by welding and/or soldering.

Figure 3:
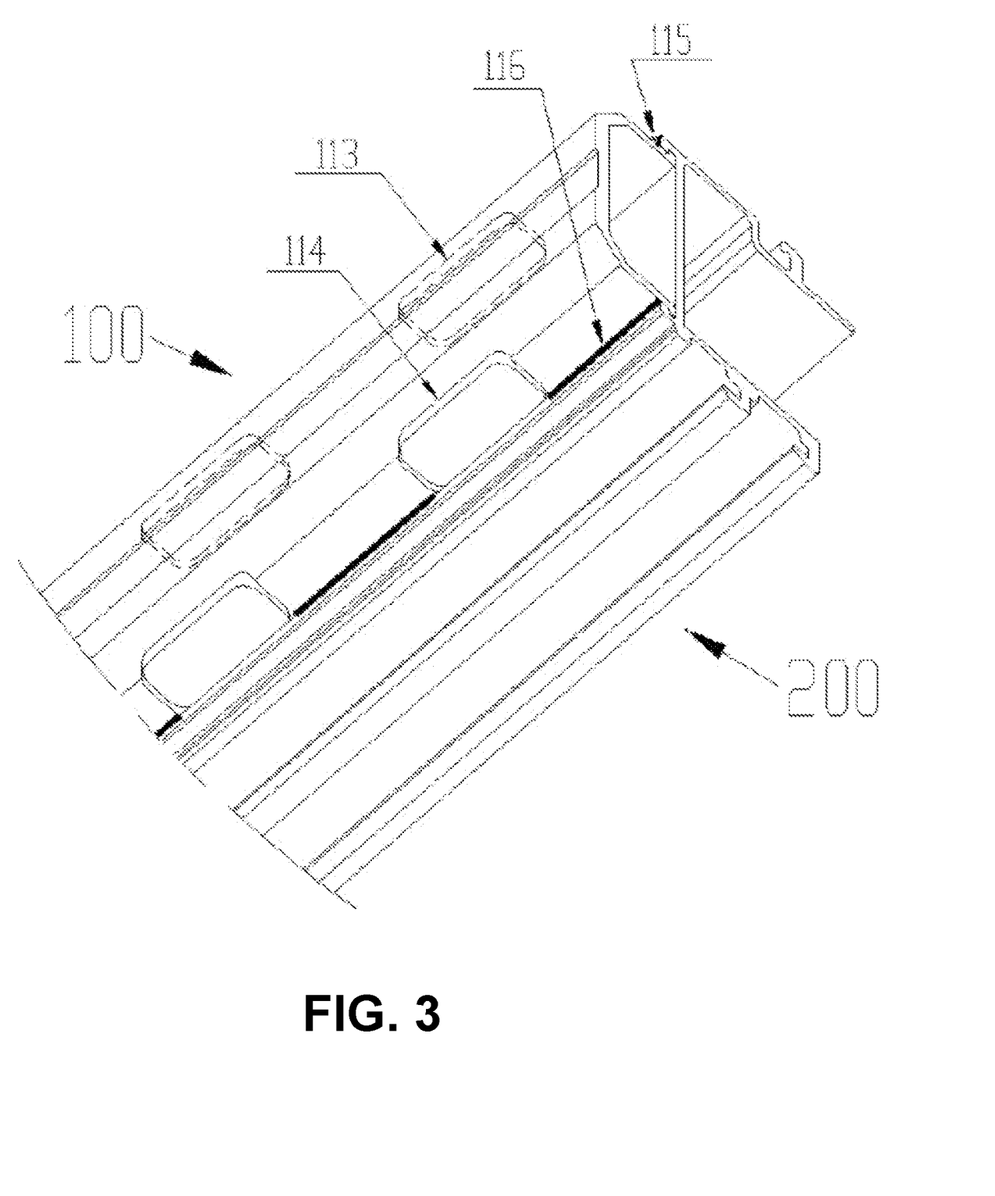
FIG. 3 is a bottom perspective view of the rub rail coupled to the side rail in accordance with one implementation of the present disclosure.

FIG. 3 is a bottom perspective view of the rub rail 100 coupled to the side rail 200 in accordance with one implementation of the present disclosure.

Figure 4:
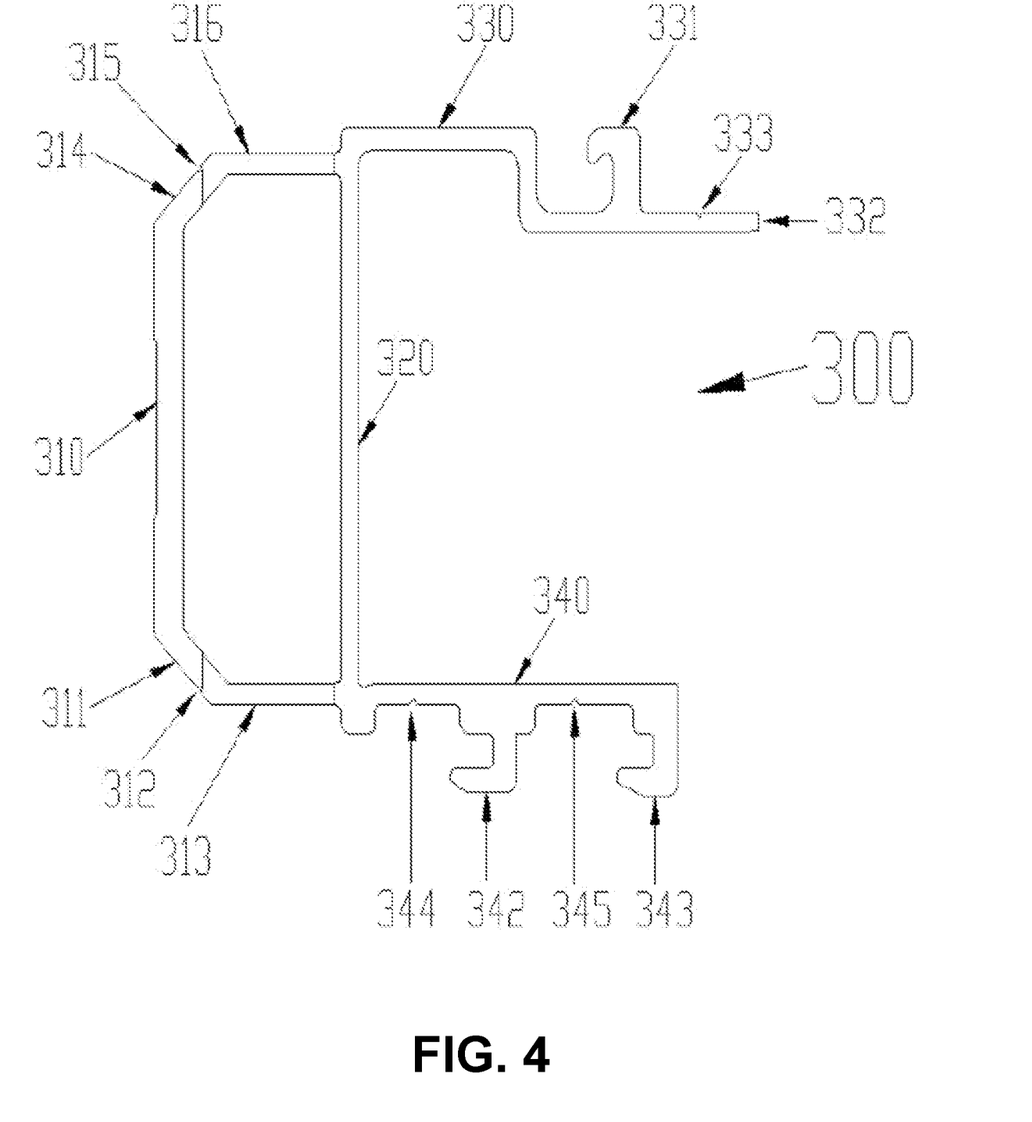
FIG. 4 is a side view a rub rail coupled to a side rail in accordance with another implementation of the present disclosure.

FIG. 4 is a side view a rub rail 360 coupled to a side rail 300 in accordance with another implementation of the present disclosure. The rub rail 360 and the side rail 300 runs the entire side of the trailer from front to rear. In one implementation, the rub rail 300 and the side rail 360 are formed with extruded aluminum.

In the illustrated implementation of FIG. 4, the side rail 300 is generally C-shaped and includes a top horizontal face 330, a side vertical face 320, and a bottom horizontal face 340. The top horizontal face 330 includes a hook 331 for attaching cargo securement devices and a downward step 332 for providing a surface to attach floor boards to the side rail 300. A notch 333 in the downward step 332 provides a mark for the location of the fasteners used to attach the floor boards to the side rail 300. The bottom horizontal face 340 includes double hooks 342, 343 for use by sliding winches and notches 344, 345 to mark the location of fasteners joining the cross members to the side rail.

In the illustrated implementation of FIG. 4, the rub rail 360 is generally C-shaped and includes a top horizontal face 316, a side vertical face 310, and a bottom horizontal face 313. The top horizontal face 316 is coupled to the side vertical face 310 by a top chamfer 314. The bottom horizontal face 313 is coupled to the side vertical face 310 by a bottom chamfer 311. Accordingly, in the illustrated implementation of FIG. 4, the rub rail 360 includes five sides, which provide physical strength and damage-resistant characteristic.

In the illustrated implementation of FIG. 4, holes 315, 312 are cut in the top and bottom chamfers 314, 311, along the length of the rub rail 360. The holes 315, 312 provide locations to attach cargo restraint devices such as hooks, chains, straps, and posts. The top holes 315 are substantially aligned with the bottom holes 312. In one implementation, the top holes 315 start at the approximate center of the surface of the top chamfer 314 and run through the edge of the top horizontal face 316 of the rub rail 360. In one implementation, the bottom holes 312 start at the approximate center of the surface of the bottom chamfer 311 and run through the edge of the bottom horizontal face 313 of the rub rail 360. Starting the cut of the holes 315, 312 approximately half way through the top and bottom chamfers 314, 311 is important for maintaining the strength of the rub rail 360 by increasing the area moment of inertia of the vertical 310, top 316, and bottom 313 faces of the rub rail 360 in more directions. This increases the stiffness and strength of the design from impacts from the side, as well as from above and below.

Figure 5:
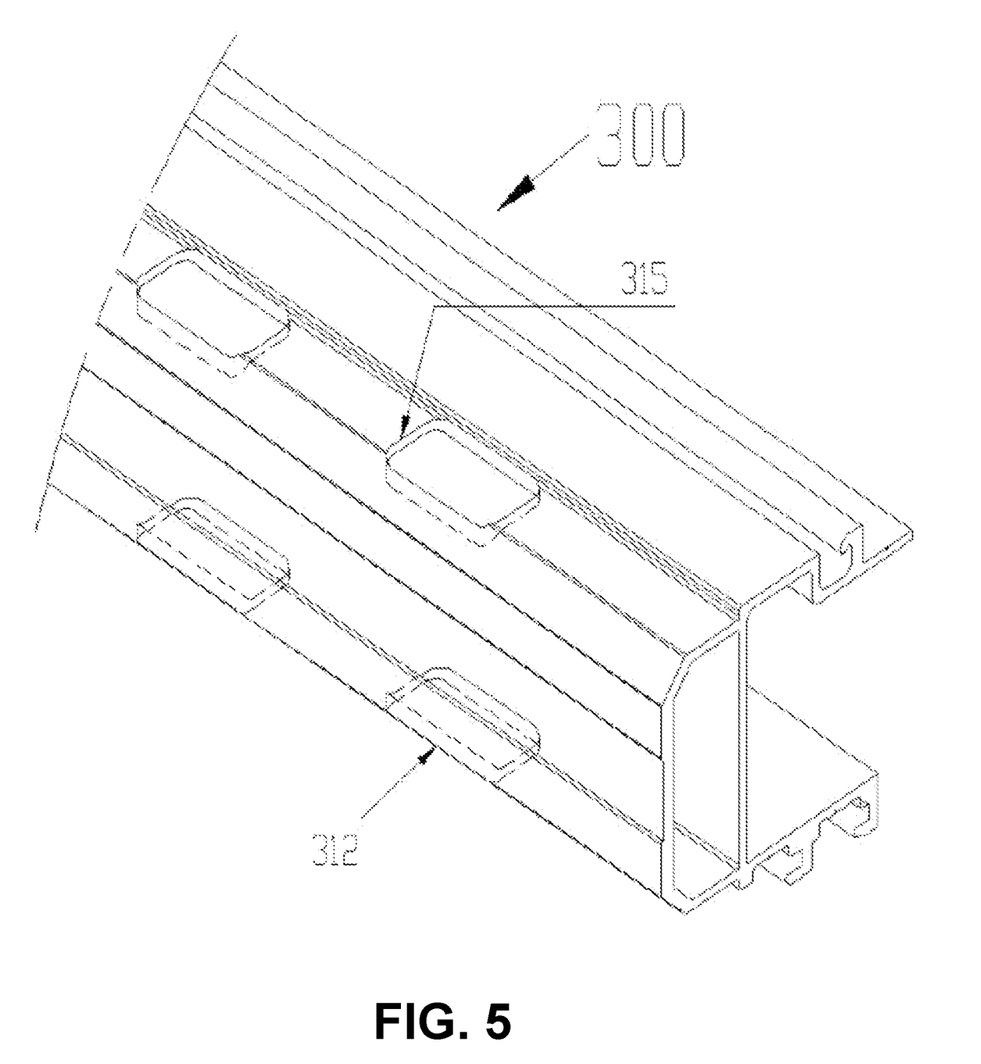
FIG. 5 is a top perspective view of the rub rail coupled to the side rail in accordance with another implementation of the present disclosure.

FIG. 5 is a top perspective view of the rub rail 360 coupled to the side rail 300 in accordance with another implementation of the present disclosure. In the illustrated implementation of FIG. 5, the rails 360, 300 are extruded together as one piece. In other implementations, the rails 360, 300 are joined together by welding and/or soldering without using notches.

Figure 6:
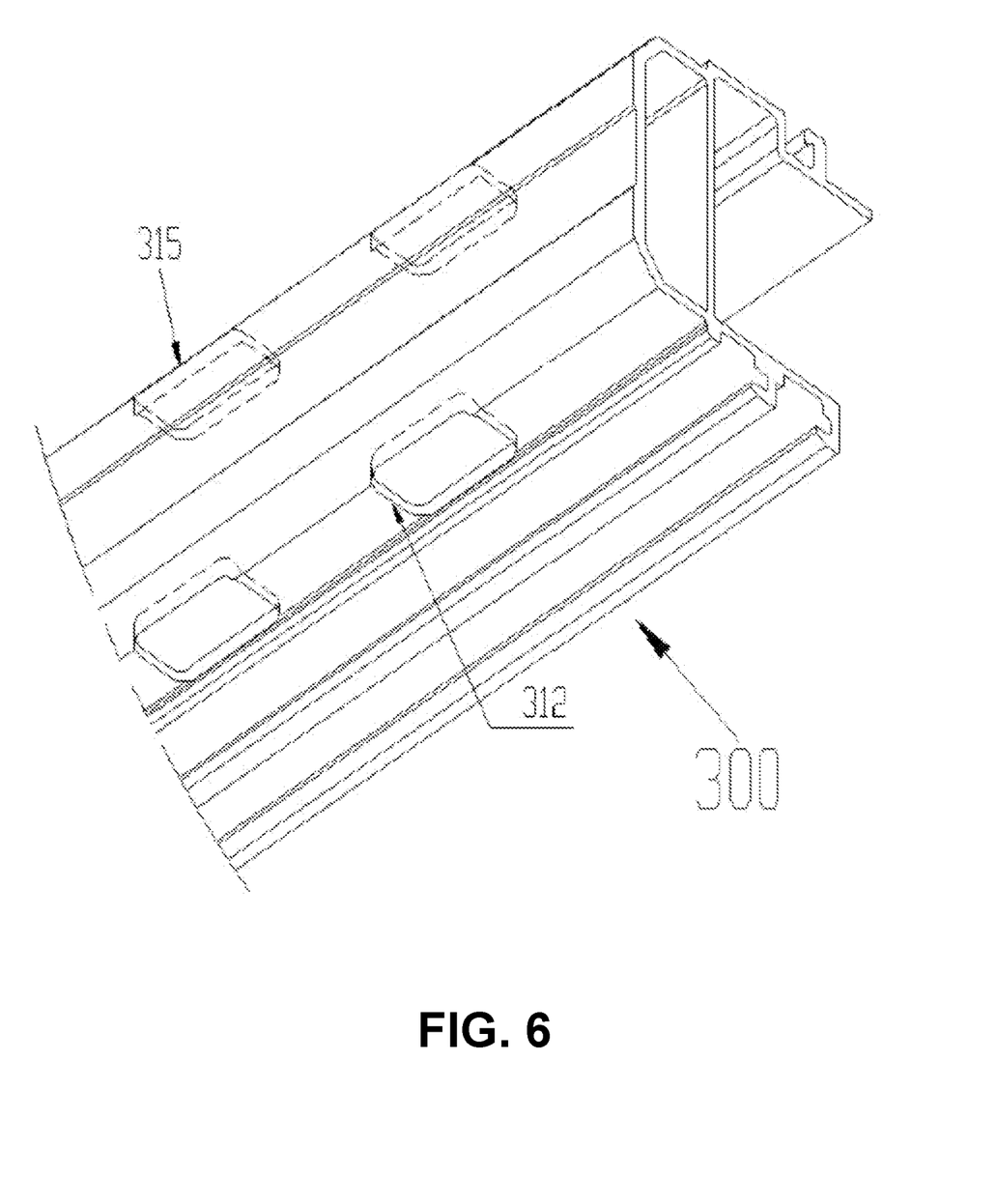
FIG. 6 is a bottom perspective view of the rub rail coupled to the side rail in accordance with another implementation of the present disclosure.

FIG. 6 is a bottom perspective view of the rub rail 360 coupled to the side rail 300 in accordance with another implementation of the present disclosure. FIG. 6 also shows the holes 315, 312.

Figure 7:
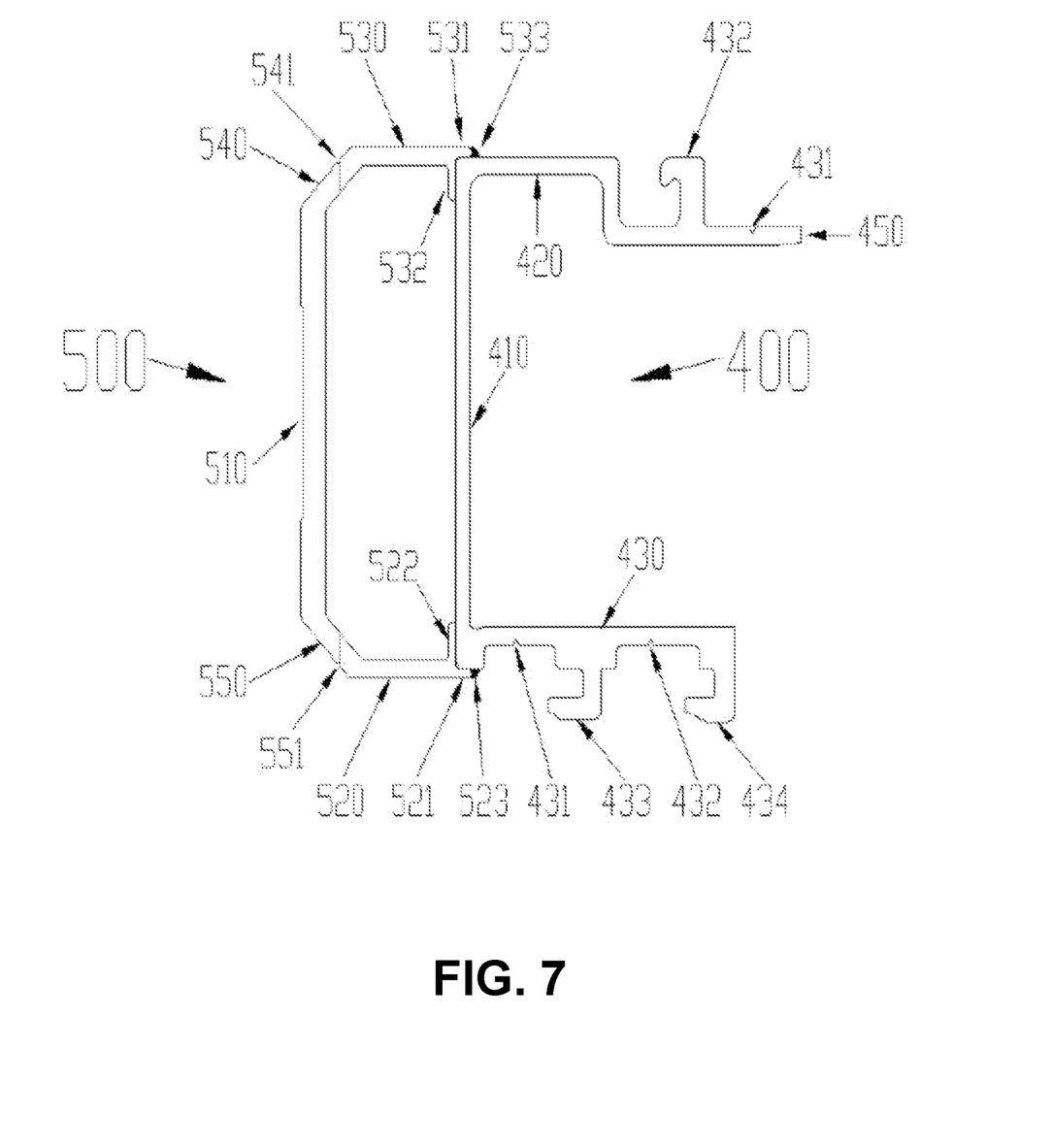
FIG. 7 is a side view a rub rail coupled to a side rail in accordance with further implementation of the present disclosure.

FIG. 7 is a side view a rub rail 500 coupled to a side rail 400 in accordance with further implementation of the present disclosure. The rub rail 500 and the side rail 400 runs the entire side of the trailer from front to rear. In one implementation, the rub rail 500 and the side rail 400 are formed with extruded aluminum.

In the illustrated implementation of FIG. 7, the side rail 400 is generally C-shaped and includes a top horizontal face 420, a side vertical face 410, and a bottom horizontal face 430. The top horizontal face 420 includes a hook 432 for attaching cargo securement devices and a downward step 450 for providing a surface to attach floor boards to the side rail 400. A notch 431 in the downward step 450 provides a mark for the location of the fasteners used to attach the floor boards to the side rail 400. The bottom horizontal face 430 includes double hooks 433, 434 for use by sliding winches and notches 431, 432 to mark the location of fasteners joining the cross members to the side rail.

In the illustrated implementation of FIG. 7, the rub rail 500 is generally C-shaped and includes a top horizontal face 530, a side vertical face 510, and a bottom horizontal face 520. The top horizontal face 530 is coupled to the side vertical face 510 by a top chamfer 540. The bottom horizontal face 520 is coupled to the side vertical face 510 by a bottom chamfer 550. Accordingly, in the illustrated implementation of FIG. 7, the rub rail 500 includes five sides, which provide physical strength and damage-resistant characteristic.

In the illustrated implementation of FIG. 7, holes 541, 551 are cut in the top and bottom chamfers 540, 550, along the length of the rub rail 500. The holes 541, 551 provide locations to attach cargo restraint devices such as hooks, chains, straps, and posts. The top holes 541 are substantially aligned with the bottom holes 551. In one implementation, the top holes 541 start at the approximate center of the surface of the top chamfer 540 and run through the edge of the top horizontal face 530 of the rub rail 500. In one implementation, the bottom holes 551 start at the approximate center of the surface of the bottom chamfer 550 and run through the edge of the bottom horizontal face 520 of the rub rail 500. Starting the cut of the holes 541, 551 approximately half way through the top and bottom chamfers 540, 550 is important for maintaining the strength of the rub rail 500 by increasing the area moment of inertia of the vertical 510, top 530, and bottom 520 faces of the rub rail 500 in more directions. This increases the stiffness and strength of the design from impacts from the side, as well as from above and below.

Figure 8:
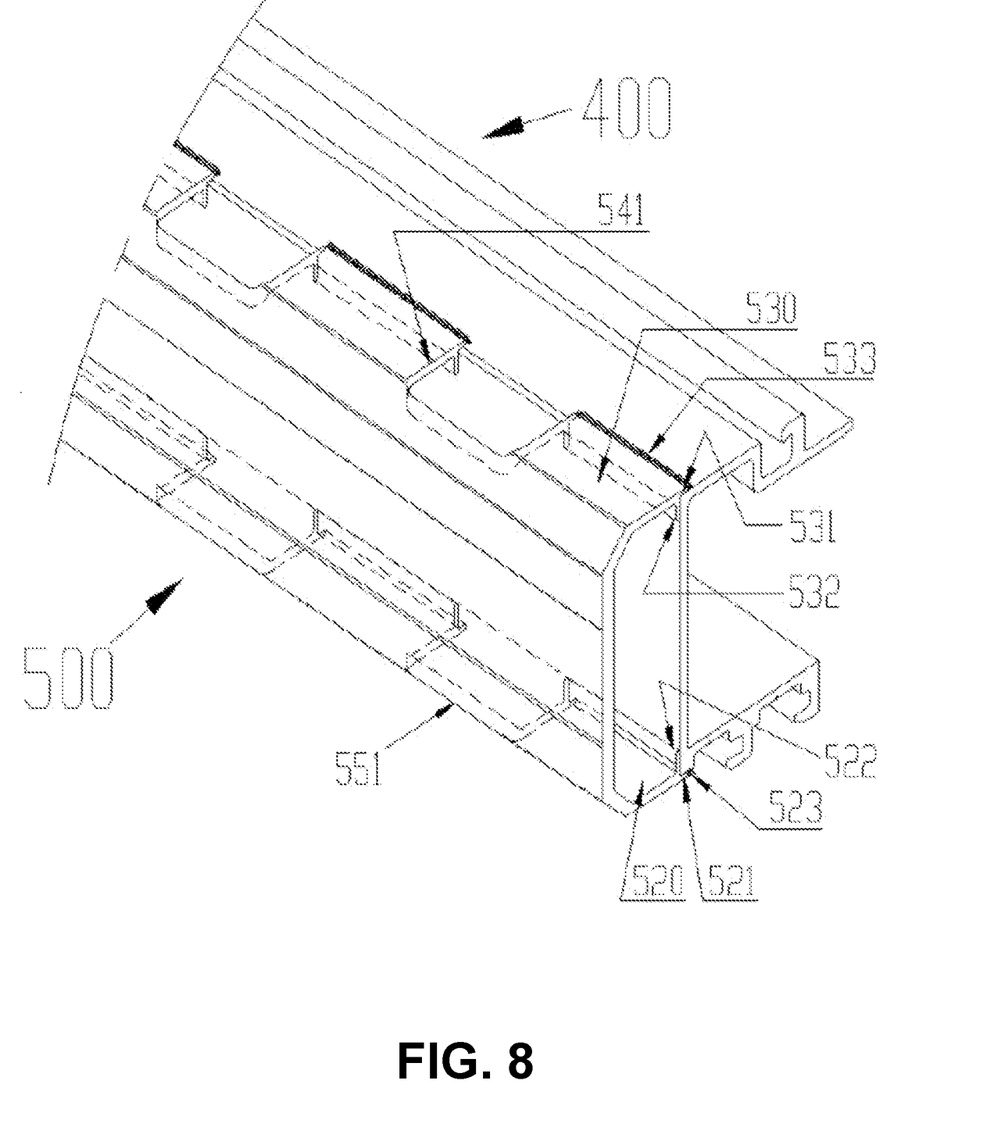
FIG. 8 is a top perspective view of the rub rail coupled to the side rail in accordance with the further implementation of the present disclosure.

FIG. 8 is a top perspective view of the rub rail 500 coupled to the side rail 400 in accordance with the further implementation of the present disclosure. In the illustrated implementation of FIG. 8, the rails 500, 400 are configured in two separate pieces without requiring the rails to slide together from the side, as shown in FIGS. 4 through 6.

In the illustrated implementation of FIG. 8, the rub rail 500 is configured to couple to the side rail 400 using a pair of walls (vertical wall 532 and horizontal wall 531) attached to the top horizontal face 530, and another pair of walls (vertical wall 522 and horizontal wall 521) attached to the bottom horizontal face 520 of the rub rail 500. The rub rail 500 is then coupled to the side rail 400 by welding and/or soldering.

Figure 9:
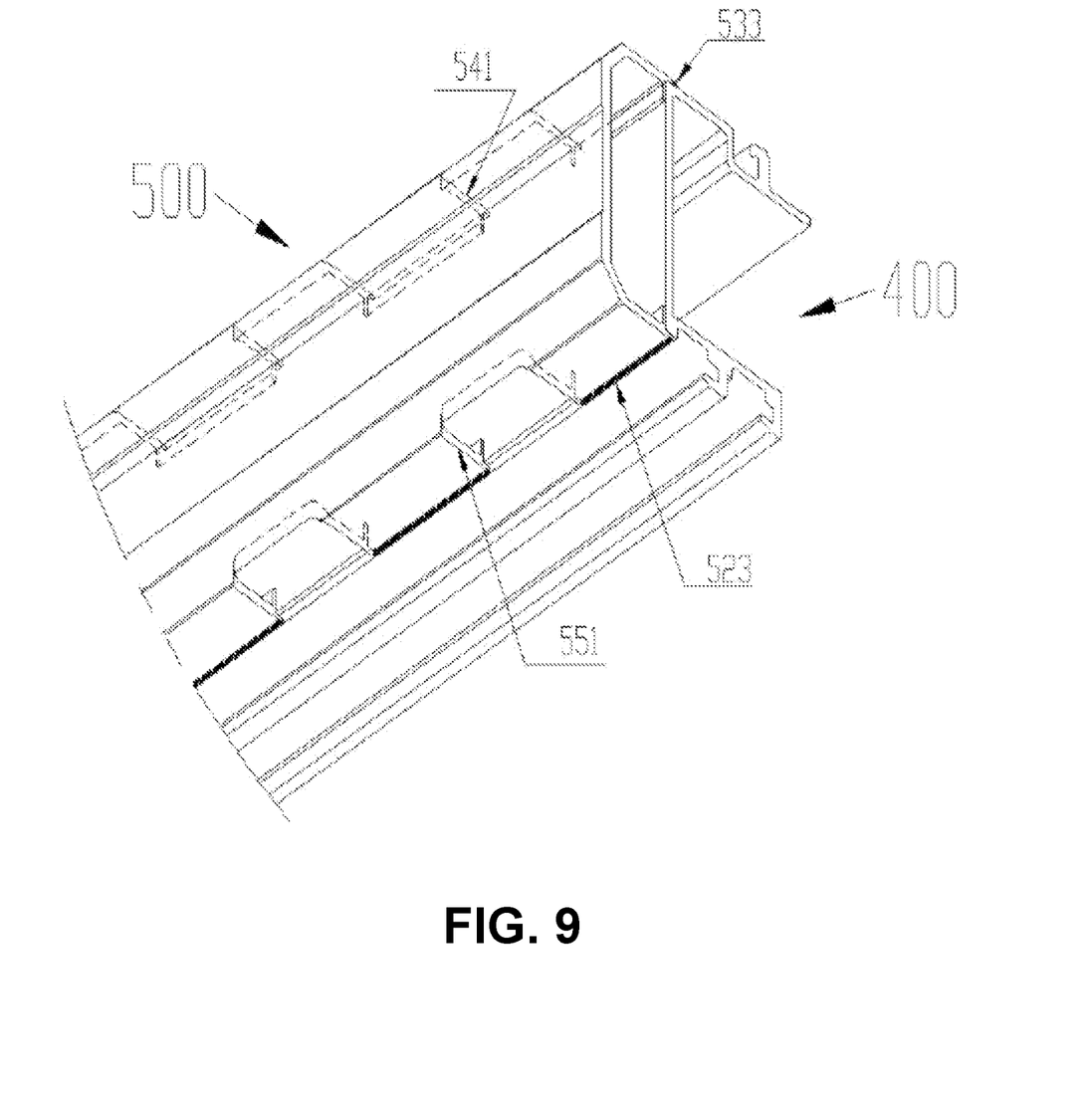
FIG. 9 is a bottom perspective view of the rub rail coupled to the side rail in accordance with the further implementation of the present disclosure.

FIG. 9 is a bottom perspective view of the rub rail 500 coupled to the side rail 400 in accordance with the further implementation of the present disclosure. FIG. 9 also shows the holes 541, 551.

In summary, the following implementations are disclosed:

In one implementation, a rail assembly for a flatbed trailer is disclosed. The rail assembly includes: a side rail configured generally as C-shaped, the side rail including a first top horizontal face, a first side vertical face, and a first bottom horizontal face; and a rub rail coupled to the side rail, the rub rail configured generally as C-shaped, the rub rail including a second top horizontal face, a second side vertical face, and a second bottom horizontal face, wherein the second top horizontal face is coupled to the second side vertical face by a top chamfer, wherein the top chamfer is diagonally connected to the second top horizontal face and the second side vertical face, wherein the second bottom horizontal face is coupled to the second side vertical face by a bottom chamfer, wherein the bottom chamfer is diagonally connected to the second side vertical face and the second bottom horizontal face.

In one implementation, the rub rail is formed with extruded aluminum. In one implementation, the first top horizontal face includes: a hook for attaching cargo securement devices; and a downward step for providing a surface to attach floor boards to the side rail. In one implementation, the downward step further includes a notch to provide a mark for location of fasteners used to attach the floor boards to the side rail. In one implementation, the first bottom horizontal face of the side rail includes at least one hook for use by sliding winches and notches to mark the location of fasteners joining cross members to the side rail. In one implementation, the rail assembly further includes: a first plurality of holes cut in the top chamfer along the length of the rub rail; and a second plurality of holes cut in the bottom chamfer along the length of the rub rail. In one implementation, the first plurality of holes is substantially aligned with the second plurality of holes. In one implementation, the first plurality of holes is positioned starting at an approximate center of surface of the top chamfer and runs through an edge of the second top horizontal face. In one implementation, the second plurality of holes is positioned starting at an approximate center of surface of the bottom chamfer and runs through an edge of the second bottom horizontal face. In one implementation, the side rail includes: a first top notch extruded as part of the first top horizontal face; and a first bottom notch extruded as part of the first bottom horizontal face. In one implementation, the rub rail includes: a second top notch extending out of the second top horizontal face; a second bottom notch extending out of the second bottom horizontal face; wherein the second top notch couples to the first top notch, and wherein the second bottom notch couples to the first bottom notch. In one implementation, the rail assembly further includes: a top joint to join the second top notch to the first top notch; and a bottom joint to join the second bottom notch to the first bottom notch. In one implementation, the top joint and the bottom joint are one of welded joint or soldered joint.

In another implementation, a rail assembly for a flatbed trailer is disclosed. The rail assembly includes: a rub rail coupled to a side rail including a first top notch and a first bottom notch, the rub rail configured generally as C-shaped, the rub rail including a top horizontal face, a side vertical face, and a bottom horizontal face, wherein the top horizontal face is coupled to the side vertical face by a top chamfer, wherein the top chamfer is diagonally connected to the top horizontal face and the side vertical face, wherein the bottom horizontal face is coupled to the side vertical face by a bottom chamfer, wherein the bottom chamfer is diagonally connected to the side vertical face and the bottom horizontal face, the rub rail including a second top notch extending out of the top horizontal face, and a second bottom notch extending out of the bottom horizontal face, wherein the second top notch couples to the first top notch of the side rail, and the second bottom notch couples to the first bottom notch of the side rail.

In one implementation, the rail assembly further includes: a first plurality of holes cut in the top chamfer along the length of the rub rail; and a second plurality of holes cut in the bottom chamfer along the length of the rub rail. In one implementation, the first plurality of holes is substantially aligned with the second plurality of holes. In one implementation, the first plurality of holes is positioned starting at an approximate center of surface of the top chamfer and runs through an edge of the second top horizontal face. In one implementation, the second plurality of holes is positioned starting at an approximate center of surface of the bottom chamfer and runs through an edge of the second bottom horizontal face.

In a further implementation, a rub rail coupled to a side rail including a first top notch and a first bottom notch is disclosed. The rub rail includes: a top chamfer; a top horizontal face diagonally connected to the top chamfer; a second top notch extending out of the top horizontal face; a side vertical face diagonally connected to the top chamfer; a bottom chamfer; a bottom horizontal face diagonally connected to the bottom chamfer; a second bottom notch extending out of the bottom horizontal face; wherein the second top notch couples to the first top notch, and wherein the second bottom notch couples to the first bottom notch.

In one implementation, the rub rail further includes: a first plurality of holes cut in the top chamfer along the length of the rub rail; and a second plurality of holes cut in the bottom chamfer along the length of the rub rail, wherein the first plurality of holes is substantially aligned with the second plurality of holes.

The above description of the disclosed implementations is provided to enable any person skilled in the art to make or use the invention as described in the specification presented above. Various modifications to these implementations will be readily apparent to those skilled in the art, and the generic principles described herein can be applied to other implementations without departing from the spirit or scope of the disclosure. Accordingly, the techniques are not limited to the specific examples described above. Thus, it is to be understood that the description and drawings presented herein represent a presently possible implementation of the disclosure and are therefore representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A side rail assembly for a flatbed trailer, the side rail assembly comprising:
   a side rail including a first top horizontal face, a first side vertical face, and a first bottom horizontal face; and
   a rub rail coupled to the side rail, the rub rail including a second top horizontal face, a second side vertical face, and a second bottom horizontal face,
   wherein the second top horizontal face is coupled to the second side vertical face by a top chamfer,
   wherein the top chamfer is diagonally connected to the second top horizontal face and the second side vertical face,
   wherein the second bottom horizontal face is coupled to the second side vertical face by a bottom chamfer,
   wherein the bottom chamfer is diagonally connected to the second side vertical face and the second bottom horizontal face, and
   wherein the side rail assembly, including the side rail and the rub rail, is extruded together as one piece.

2. The side rail assembly of claim 1, wherein the side rail assembly is formed with extruded aluminum.

3. The side rail assembly of claim 1, wherein the second top horizontal face steps down into a downward step of the first top horizontal face to provide a surface to attach floor boards to the side rail.

4. The side rail assembly of claim 1, wherein the first top horizontal face of the side rail includes a hook for attaching cargo securement devices.

5. The side rail assembly of claim 1, wherein the first bottom horizontal face of the side rail includes
   at least one hook for use by sliding winches and notches to mark a location of fasteners joining cross members to the side rail.

6. A side rail assembly for a flatbed trailer extruded as a single piece, the side rail assembly comprising:
   a rub portion including
      a top horizontal face,
      a top chamfer diagonally coupled to the top horizontal face,
      an outer vertical face coupled to the top chamfer,
      a bottom chamfer diagonally coupled to the outer vertical face,
      a bottom horizontal face coupled to the bottom chamfer, and an inner vertical face coupled to the top horizontal face and the bottom horizontal face; and a side portion including
- a top downward step surface coupled to the inner vertical face, the top downward step surface formed as a step down from the top horizontal face of the rub portion, and
- a bottom surface coupled to the inner vertical face, the bottom surface extending outward from the bottom horizontal face of the rub portion.

7. The side rail assembly of claim 6, wherein the side rail assembly is formed as the single piece with extruded aluminum.

8. The side rail assembly of claim 6, wherein the top downward step surface of the side portion provides a surface to attach floor boards to the side portion.

9. The side rail assembly of claim 6, wherein the top downward step surface of the side portion includes a hook for attaching cargo securement devices.

10. The side rail assembly of claim 6, wherein the bottom surface of the side portion includes
- at least one hook for use by sliding winches and notches to mark a location of fasteners joining cross members to the side portion.

11. A side rail assembly, comprising:
- a top horizontal face;
- a top chamfer diagonally coupled to the top horizontal face;
- an outer vertical face coupled to the top chamfer;
- a bottom chamfer diagonally coupled to the outer vertical face;
- a bottom horizontal face coupled to the bottom chamfer;
- an inner vertical face coupled to the top horizontal face and the bottom horizontal face;
- a top downward step face coupled to the inner vertical face, the top downward step face formed as a step down from the top horizontal face
wherein the top downward step face provides a surface to attach floor boards to the side rail assembly; and
- a bottom extension face coupled to the inner vertical face, the bottom extension face extending outward from the bottom horizontal face,
wherein the side rail assembly is extruded as one piece.

12. The side rail assembly of claim 11, wherein the top downward step face provides a surface to attach floor boards to the side rail assembly.

13. The side rail assembly of claim 11, wherein the top downward step face includes a hook for attaching cargo securement devices.

14. The side rail assembly of claim 11, wherein the bottom extension face includes
- at least one hook for use by sliding winches and notches to mark a location of fasteners joining cross members to the side rail assembly.

* * * * *